US010994342B2

(12) United States Patent
Ida et al.

(10) Patent No.: US 10,994,342 B2
(45) Date of Patent: May 4, 2021

(54) CUTTING INSERT AND CUTTING TOOL

(71) Applicant: TUNGALOY CORPORATION, Fukushima (JP)

(72) Inventors: Takehiro Ida, Iwaki (JP); Ryuichi Saji, Iwaki (JP)

(73) Assignee: TUNGALOY CORPORATION, Iwaki (JP)

( * ) Notice: Subject to any disclaimer, the term of this patent is extended or adjusted under 35 U.S.C. 154(b) by 0 days.

(21) Appl. No.: 16/048,255

(22) Filed: Jul. 28, 2018

(65) Prior Publication Data
US 2019/0047061 A1    Feb. 14, 2019

(30) Foreign Application Priority Data
Aug. 10, 2017 (JP) .............................. JP2017-155865

(51) Int. Cl.
*B23B 27/16* (2006.01)
(52) U.S. Cl.
CPC .. *B23B 27/1622* (2013.01); *B23B 2200/0495* (2013.01); *B23B 2200/121* (2013.01); *B23B 2200/165* (2013.01); *B23B 2205/12* (2013.01)
(58) Field of Classification Search
CPC ............. B23B 27/1622; B23B 27/1611; B23B 27/1603; B23B 27/16; B23B 27/164; B23B 27/1614; B23B 27/1618; B23B 29/043; B23B 2200/0495; B23B 2200/049; B23B 2200/121; B23B 2200/165; B23B 2200/048; B23B 2205/12; B23C 2200/0483; B23C 2200/0477; B23C 2200/121; B23C 2200/161; B23C 2210/168
See application file for complete search history.

(56) References Cited

U.S. PATENT DOCUMENTS

| 3,938,230 | A | * | 2/1976 | Rice | ........................ | B23B 27/08 |
| | | | | | | 407/107 |
| 4,056,872 | A | * | 11/1977 | Seidel | ................... | B23B 27/143 |
| | | | | | | 407/114 |
| 4,315,706 | A | * | 2/1982 | Erkfritz | ............... | B23B 27/1611 |
| | | | | | | 407/101 |

(Continued)

FOREIGN PATENT DOCUMENTS

| CH | 477249 A | * | 8/1969 | ........... B23B 27/141 |
| DE | 202013102510 U1 | * | 6/2014 | ............. B23C 5/109 |

(Continued)

OTHER PUBLICATIONS

Description JP2007075932A (translation) obtained at https://worldwide.espacenet.com/ (last visited Oct. 13, 2020).*

*Primary Examiner* — Ryan C Rufo
(74) *Attorney, Agent, or Firm* — Studebaker & Brackett PC

(57) ABSTRACT

A cutting insert is provided, which can be prevented from being lifted from a tool body. A cutting insert includes two end surfaces opposed to each other, a peripheral side surface extending between the two end surfaces, a cutting edge provided at an intersecting edge between at least one of the two end surfaces and the peripheral side surface, and a fixing hole provided in an end surface direction from the first end surface to the second end surface. The peripheral side surface is provided with raised parts changing in height in the end surface direction.

8 Claims, 10 Drawing Sheets

(56) References Cited

U.S. PATENT DOCUMENTS

| | | | | |
|---|---|---|---|---|
| 4,411,565 A | * | 10/1983 | Hazra | B23B 27/143 407/114 |
| 4,632,608 A | * | 12/1986 | Blomberg | B23B 27/145 407/114 |
| 4,890,961 A | * | 1/1990 | Carl | B23B 27/04 407/105 |
| 7,300,232 B2 | * | 11/2007 | Wiman | B23B 27/145 407/101 |
| 7,632,046 B2 | * | 12/2009 | Andersson | B23B 27/065 407/113 |
| 8,402,867 B2 | * | 3/2013 | Harif | B23B 27/045 29/90.01 |
| 9,144,848 B2 | * | 9/2015 | Konta | B23C 5/109 |
| 10,005,131 B2 | * | 6/2018 | Muthuswamy | B23B 27/145 |
| 2004/0265073 A1 | | 12/2004 | Hoefler et al. | |
| 2005/0019111 A1 | * | 1/2005 | Kitagawa | B23B 27/141 407/113 |
| 2006/0216121 A1 | | 9/2006 | Edler et al. | |
| 2006/0257216 A1 | | 11/2006 | Kimura et al. | |
| 2007/0003384 A1 | * | 1/2007 | Smilovici | B23C 5/2221 407/113 |
| 2011/0142555 A1 | * | 6/2011 | Yamazaki | B23B 27/143 407/2 |
| 2013/0183110 A1 | * | 7/2013 | Schaefer | B23B 27/08 407/102 |
| 2013/0202371 A1 | | 8/2013 | Chen | |
| 2013/0236255 A1 | | 9/2013 | Hecht | |
| 2014/0227051 A1 | | 8/2014 | Hecht et al. | |
| 2014/0348599 A1 | * | 11/2014 | Kovac | B23B 27/1611 407/42 |
| 2016/0107248 A1 | | 4/2016 | Smycek | |
| 2017/0100777 A1 | | 4/2017 | Lof et al. | |
| 2017/0100778 A1 | * | 4/2017 | Lof | B23B 1/00 |
| 2017/0120342 A1 | * | 5/2017 | Fuju | B23B 27/143 |

FOREIGN PATENT DOCUMENTS

| | | | | |
|---|---|---|---|---|
| EP | 2805786 A1 | * | 11/2014 | B23C 5/207 |
| GB | 2081142 A | * | 2/1982 | B23B 27/1614 |
| JP | 2004-261883 A | | 9/2004 | |
| JP | 2007075932 A | * | 3/2007 | |
| JP | 2013075337 A | | 4/2013 | |
| JP | 2015089602 A | | 5/2015 | |
| JP | 2016-539010 A | | 12/2016 | |
| WO | WO-2008062825 A1 | * | 5/2008 | B23B 29/043 |
| WO | WO-2014081010 A1 | * | 5/2014 | B22F 7/06 |
| WO | 2017/060025 A1 | | 4/2017 | |

* cited by examiner

CUTTING INSERT AND CUTTING TOOL

BACKGROUND

Field

The present invention relates to a cutting insert and a cutting tool.

Description of Related Art

A bit (cutting tool) for a lathe is used for cutting processing and the cutting tool includes a body and a cutting insert mounted to the body. The cutting insert includes two polygonal end surfaces opposed to each other at the top and the bottom and a peripheral side surface which connects the two end surfaces, and cutting edges are formed at ridges between the peripheral side surface and the end surfaces. The cutting insert is fixed to the holder of the body by a screw or a fixing lever.

During cutting, large cutting resistance acts upon the cutting insert. The cutting resistance may cause the cutting insert to move relative to the holder of the body, which shifts the edge position of the cutting insert, and the cutting processing precision is lowered. Therefore, it has been suggested to provide a groove which fits with a body holding surface at an end surface of the cutting insert (see WO 2017/060025) or provide irregularities in the peripheral direction at the peripheral side surface of the cutting insert (see Patent Publication JP-A-2004-261883), so that turning (side slip) of the cutting insert is prevented.

SUMMARY

However, the cutting tools described above do not provide sufficient force to press the cutting insert to the side of the body holding surface (downward), and the cutting insert may be lifted during cutting. This may shift the position of the edges of the cutting insert in the vertical direction.

With the foregoing in view, it is an object of the present invention to provide a cutting insert which can be prevented from being lifted from a body (tool body) and a cutting tool.

A cutting insert according to one aspect of the present invention includes two end surfaces opposed to each other, a peripheral side surface extending between the two end surfaces, a cutting edge provided at an intersecting edge between at least one of the two end surfaces and the peripheral side surface, and a fixing hole provided in an end surface direction from a first end surface to a second end surface of the two end surfaces, the peripheral side surface has a plurality of raised parts changing in height in the end surface direction, and the raised parts each has a first inclined surface raised from the first end surface side to a center in the end surface direction and a second inclined surface raised from the second end surface side to the center in the end surface direction.

According to the aspect, the raised part changing in height is provided at the peripheral side surface of the cutting insert in the end surface direction, the tool body can press the first or second inclined surface of the raised part from above to hold the cutting insert. In this way, the cutting insert can be pressed with sufficient force to the side of the holding surface of the tool body (downward), so that the cutting insert can be prevented from being lifted from the tool body.

The two end surfaces may be formed in a polygonal shape having three or more sides, the peripheral side surface may have a plurality of peripheral side surface parts corresponding to sides of the polygonal shape of the end surfaces, and the raised part may be provided at each of the peripheral side surface parts. In this case, the cutting insert can be changed in direction and used.

A plurality of the raised parts may be provided at the peripheral side surface parts respectively. In this case, sufficient force acting to press the raised part from above by the tool body can be secured.

The fixing hole may be formed in a center of the end surface, and the end surface may be provided with a groove extending outwardly from the fixing hole toward the peripheral side surface. In this case, the protrusion of the holding surface of the tool body is fitted in the groove, so that force for pressing the cutting insert can be received at the groove. The cutting insert can be prevented from turning relative to the tool body.

The groove may be provided on an opposite side to each of the peripheral side surface parts, with the fixing hole therebetween, at the end surface. In this case, the groove is provided away from the raised part at each of the peripheral side surface parts, so that force for pressing the cutting insert can appropriately be received at the groove. The cutting insert can effectively be prevented from turning relative to the tool body.

A flat surface positioned higher than other parts may be provided at the end surface. In this case, force for pressing the cutting insert from above can be received at the flat surface of the end surface, so that the cutting insert can securely be fixed.

The flat surface may be provided between the fixing hole and each of the peripheral side surface parts along the peripheral side surface part. In this case, the flat surface is provided close to the peripheral side surface parts, so that force for pressing the cutting insert can appropriately be received at the flat surface.

The flat surface may annularly be provided at the end surface. In this case, chips are less likely to come inside beyond the flat surface, and therefore parts on the inner side of the flat surface at the end surface can be prevented from being damaged by chips.

A cutting tool according to another aspect of the present invention includes a cutting insert and a tool body holding the cutting insert, the cutting insert includes two end surfaces opposed to each other, a peripheral side surface extending between the two end surfaces, a cutting edge provided at an intersecting edge between at least one of the two end surfaces and the peripheral side surface, and a fixing hole provided in an end surface direction from a first end surface to a second end surface of the two end surfaces, the peripheral side surface has a plurality of raised parts changing in height in the end surface direction, the raised part has a first inclined surface raised from the first end surface side to a center in the end surface direction and a second inclined surface raised from the second end surface side to the center in the end surface direction, the tool body includes a first holding surface holding one end surface of the cutting insert and a second holding surface holding the peripheral side surface of the cutting insert held at the first holding surface, the second holding surface has a reversely inclined surface receding from an upper side toward the first holding surface, and the reversely inclined surface is configured to abut against the first or second inclined surface of the raised part to press the inclined surface from above.

The two end surfaces may be formed in a polygonal shape having three or more sides, the peripheral side surface has a plurality of peripheral side surface parts corresponding to sides of the polygonal shape of the end surfaces, the raised part may be provided at each of the peripheral side surface parts, and the second holding surface may abut against the raised part at one of the peripheral side surface parts to press the raised part.

The fixing hole may be formed in the center of the end surface, the end surface may be provided with a groove extending outwardly from the fixing hole toward the peripheral side surface, and the first holding surface may be provided with a protrusion to be fitted in the groove.

The groove may be provided on an opposite side to each of the peripheral side surface parts, with the fixing hole therebetween, at the end surface, and the protrusion may be provided to be fitted in the groove provided on an opposite side to the peripheral side surface part held at the second holding surface, with the fixing hole therebetween.

A flat surface positioned higher than other parts may be provided at the end surface, and the first holding surface may be provided with a flat holding surface contacted by at least a part of the flat surface.

The flat surface may be provided between the fixing hole and each of the peripheral side surface parts along the peripheral side surface part, and the flat holding surface may be provided in contact with the flat surface between the peripheral side surface part held at the second holding surface and the fixing hole.

The flat surface may annularly be provided at the end surface.

DETAILED DESCRIPTION

Figure 1:
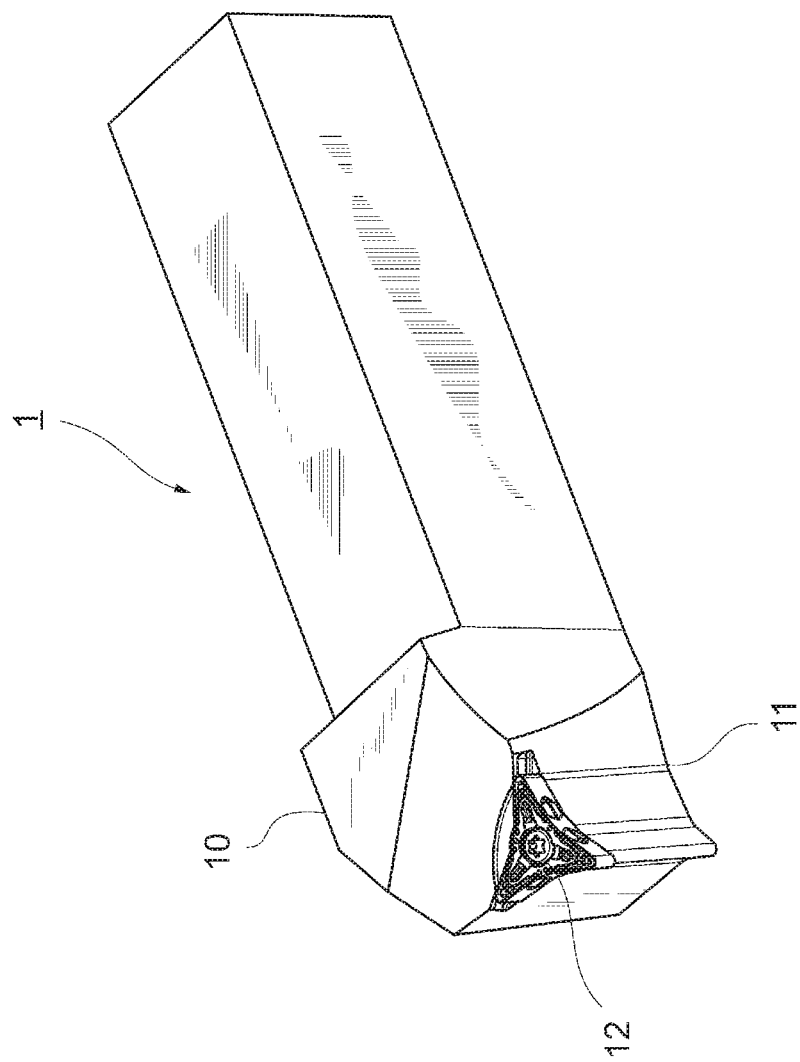
FIG. 1 is a perspective view of a cutting tool.

Hereinafter, a preferred embodiment of the present invention will be described in conjunction with the accompanying drawings. Note that the same elements are designated by the same reference characters and their description will not be repeated. The positional relation for example about the top, bottom, left, and right is based on the positional relation shown in the drawings unless otherwise specified. The dimensional ratios are not limited to those shown in the drawings. The following embodiment is an example for describing the present invention and is not intended to limit the present invention.

FIG. 1 is a perspective view of a cutting tool 1 according to the embodiment. The cutting tool 1 includes a tool body 10 for a lathe in a square column shape elongated in one direction and a cutting insert 11 mounted to a tip end of the tool body 10. The cutting insert 11 is fixed to the tool body 10 for example by a fastening screw 12. Note that the cutting insert 11 may be fixed to the tool body 10 by a fixing lever according to another known method.

Cutting Insert

Figure 2:
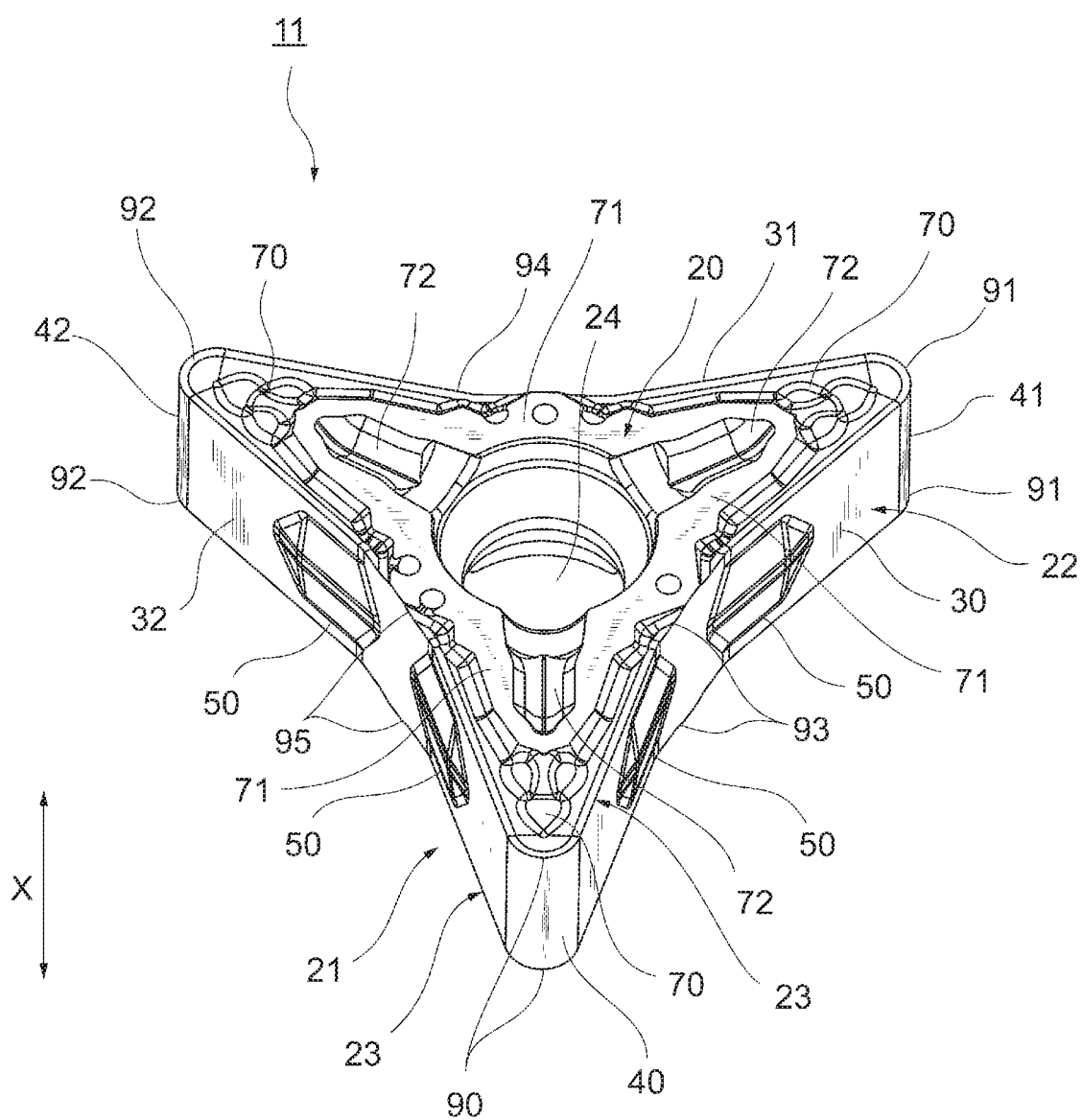
FIG. 2 is a perspective view of a cutting insert.
Figure 3:
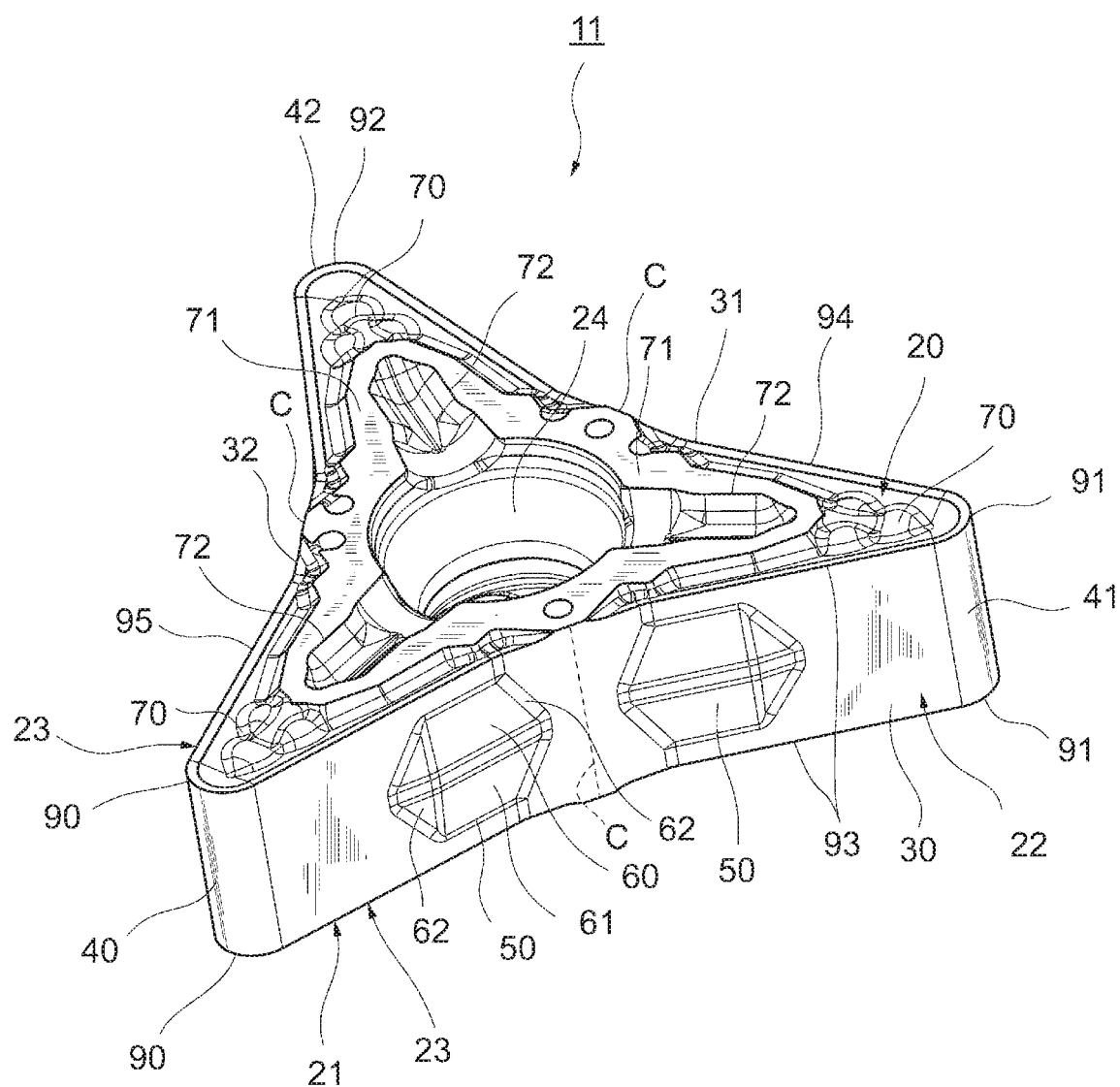
FIG. 3 is a perspective view of the cutting insert.
Figure 4:
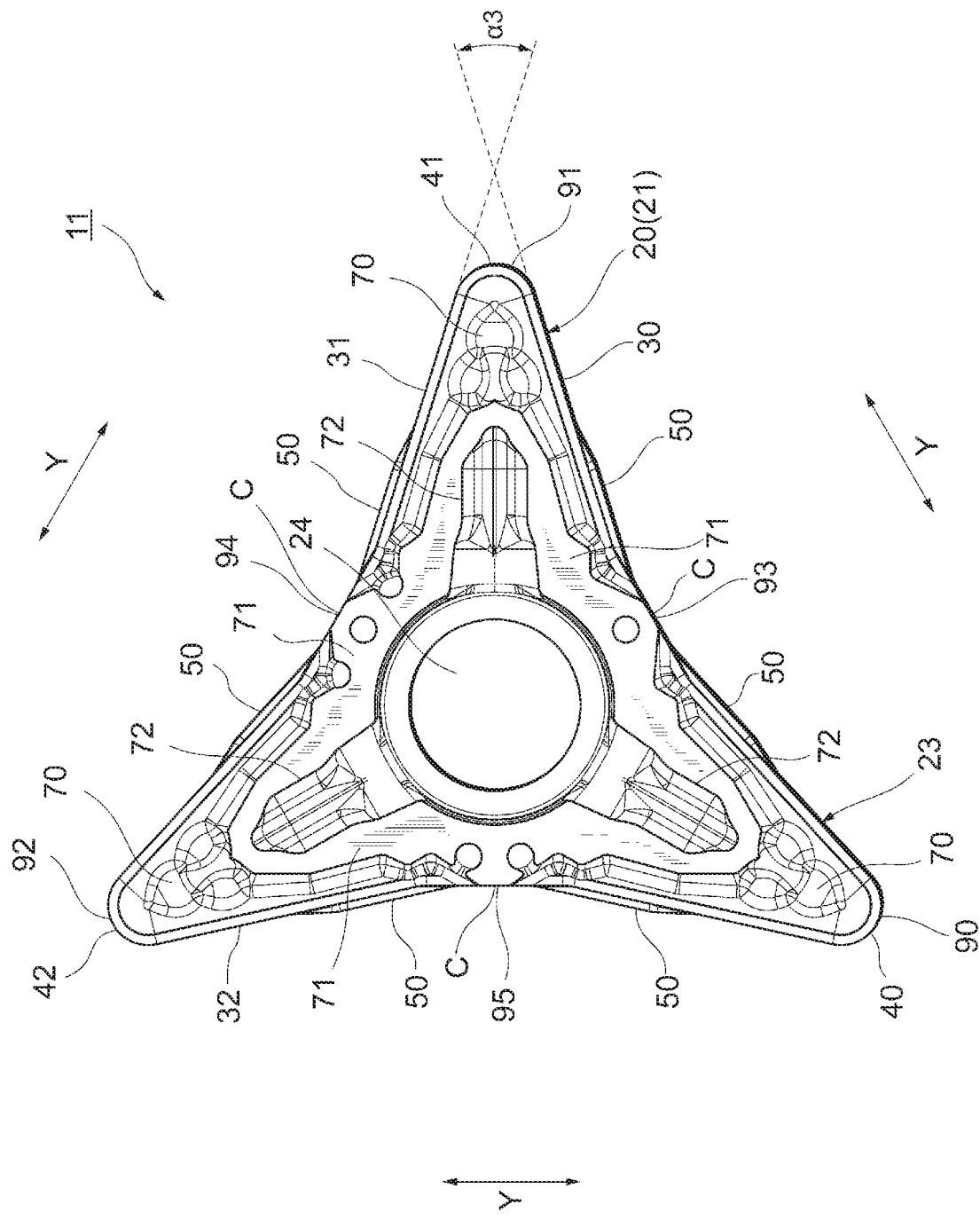
FIG. 4 is a view of the cutting insert from the side of an end surface.

FIGS. 2 and 3 are perspective views of the cutting insert 11, and FIG. 4 is a view of the cutting insert 11 from the side of a first end surface 20. The cutting insert 11 is for example suited for profile machining using an automatic lathe. The cutting insert 11 has a substantially polygonal shape such as a substantially triangular shape with a thickness.

The cutting insert 11 includes first and second end surfaces 20 and 21 opposed to each other, a peripheral side surface 22 which extends between the first end surface 20 and the second end surface 21, and cutting edges 23 formed at intersecting edges between the two end surfaces 20 and 21 and the peripheral side surface 22. A fixing hole 24 is formed through the center of the cutting insert 11 in an end surface direction X (shown in FIG. 2) from the first end surface 20 to the second end surface 21. The diameter of the fixing hole 24 is for example about in the range from 2.0 mm to 3.0 mm.

The two end surfaces 20 and 21 both have a substantially triangular shape, and the peripheral side surface 22 has three peripheral side surface parts 30, 31, and 32 corresponding to the sides of the triangular shapes of the end surfaces 20 and 21. The connection part between adjacent ones among the peripheral side surface parts 30, 31, and 32 are provided with corner parts 40, 41, and 42. As shown in FIG. 4, when viewed from the side of the end surface 20, the peripheral side surface parts 30, 31, and 32 are each formed in a V-shape and have a center C in a peripheral surface direction Y (Y direction as shown in FIG. 4) which is recessed to the side of the fixing hole 24 (on the center side of the cutting insert 11).

The peripheral side surface part 30 has two raised parts 50 that change in height in the end surface direction X. The two raised parts 50 are provided bilaterally symmetrically with respect to the center C of the peripheral side surface part 30 in the peripheral surface direction Y. As shown in FIG. 3, the raised parts 50 are arranged closer to the center C than the corner parts 40 and 41 (in positions closer to the center C than the apexes of the corner parts 40 and 41).

Figure 5:
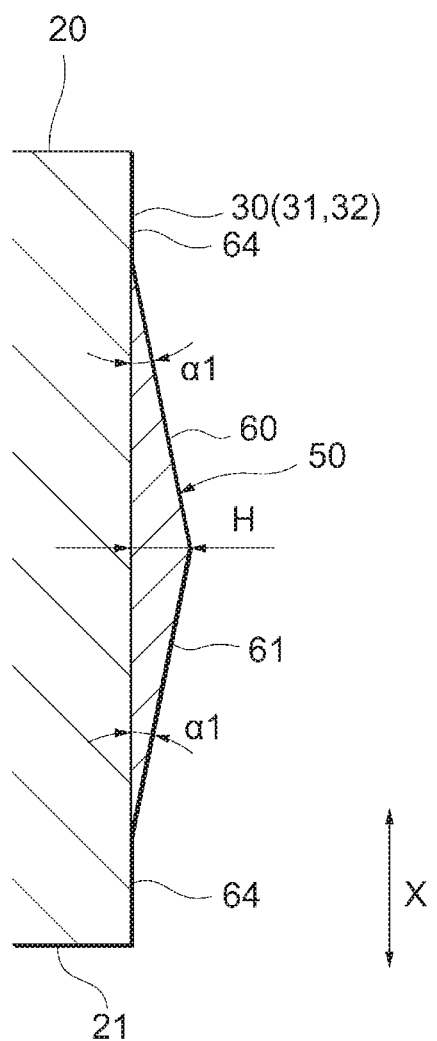
FIG. 5 is a view for illustrating a section of a raised part.
Figure 6:
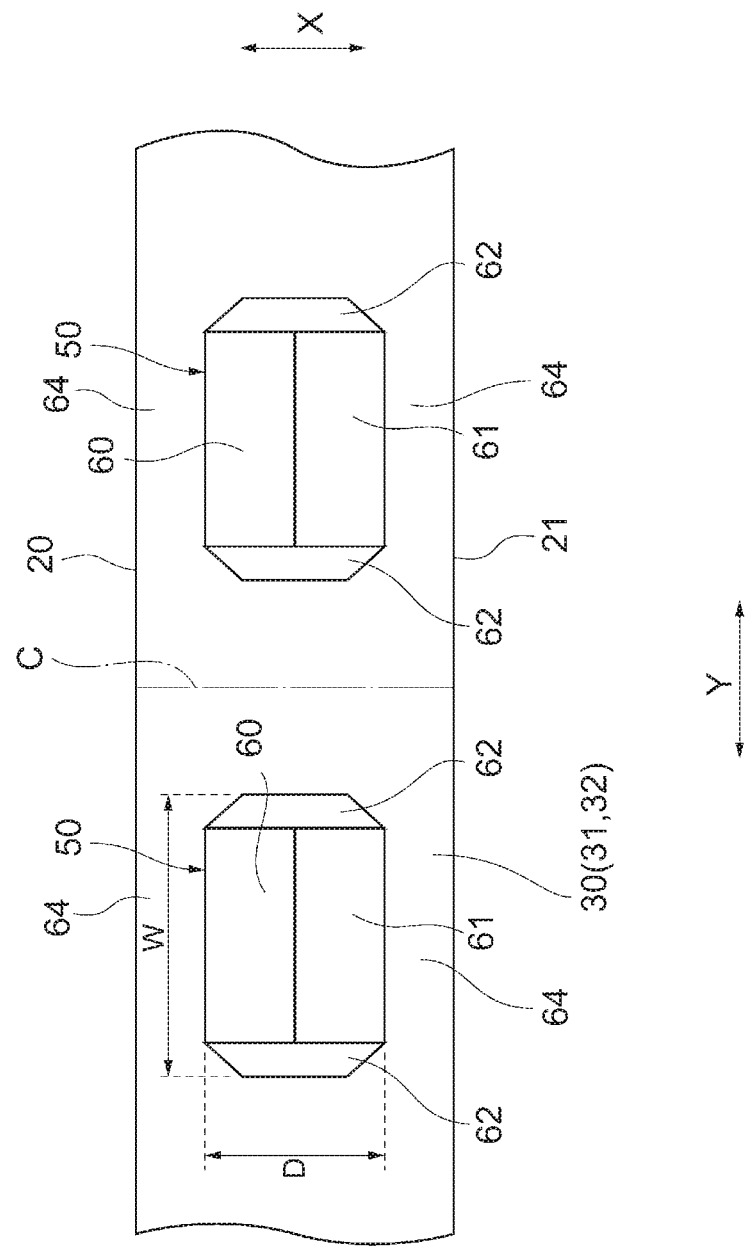
FIG. 6 is a view for illustrating the raised part at a peripheral side surface part.

The raised part 50 has a V-shaped section as shown in FIG. 5. For example, as shown in FIGS. 5 and 6, the raised part 50 includes a first inclined surface 60 gradually raised from the side of the first end surface 20 to the center, a second inclined surface 61 gradually raised from the side of the second end surface 21 to the center, and left and right inclined surfaces 62 provided on the left and right of the first and second inclined surfaces 60 and 61 in the peripheral surface direction Y. The height H (shown in FIG. 5) of the raised part 50 is preferably from 0.1 mm to 0.6 mm. The inclination angle α1 of the first and second inclined surfaces 60 and 61 of the raised part 50 is preferably from 5° to 30°, for example 10°. The lateral length W (shown in FIG. 6) of the raised part 50 is preferably about 4 mm. The width D of the raised part 50 in the vertical direction is preferably about 3 mm. The width D of the raised part 50 in the vertical direction is in the range from 60% to 70% of the height of the cutting insert 11 (the distance between the end surfaces 20 and 21) in the end surface direction X, and a flat surface (non-raised part) 64 is formed under and above the raised part 50 at the peripheral side surface part 30. The raised part 50 is formed in the center of the cutting insert 11 in the end surface direction X.

The peripheral side surface parts 30, 31, and 32 are arranged with 120°-rotational symmetry around the central axis of the fixing hole 24 of the cutting insert 11. The peripheral side surface parts 31 and 32 have the same structure as that of the peripheral side surface part 30, and the peripheral side surface parts 31 and 32 each have two raised parts 50 similarly to the peripheral side surface part 30.

As shown in FIGS. 2 to 4, the first end surface 20 has a chip breaker (groove) 70 formed on the inner side of the cutting edge 23, an annular flat surface 71 formed on the inner side of the chip breaker, and a groove 72 formed on the inner side of the flat surface.

Figure 7:
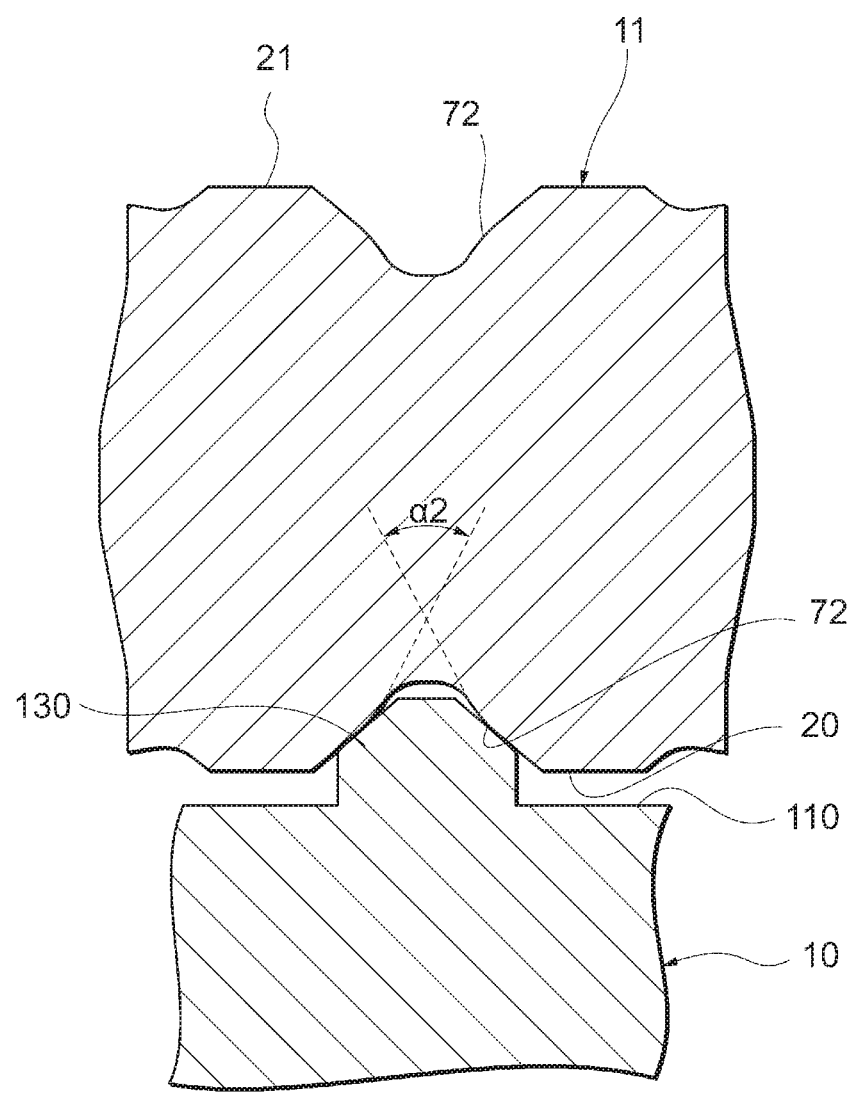
FIG. 7 is a longitudinal sectional view for illustrating how a groove of the cutting insert and the raised part of a first holding surface are fitted with each other.

The groove 72 is provided so that a protrusion 130, which will be described, is fitted therein. The grooves 72 are formed in three directions toward the corner parts 40, 41, and 42 from the fixing hole 24 in the center. The groove 72 has a length at least equal to a half of the distance from the center of the fixing hole 24 to the tip end of each of the corner parts 40, 41, and 42. The length of the groove 72 is for example about 5 mm from the center of the fixing hole 24. The groove 72 has a greater width on the root side (the side of the fixing hole 24) than on the tip end side (on the side of the corner parts 40, 41, or 42). The groove 72 is formed to have a longitudinal section recessed in a substantially V-shape as shown in FIG. 7. The inner angle $\alpha 2$ of the V-shape of the groove 72 is for example about 90°. The groove 72 has a depth of about 0.5 mm.

As shown in FIGS. 2 to 4, the flat surface 71 is formed to have a substantially triangular annular shape along the peripheries of the grooves 72 in the three directions and the fixing hole 24. More specifically, the flat surface 71 is formed to detour around the grooves 72 and the fixing hole 24. The flat surface 71 has its highest level surface at the first end surface 20. The flat surface 71 is provided between the peripheral side surface part 30 and the fixing hole 24, between the peripheral side surface part 31 and the fixing hole 24, and between the peripheral side surface part 32 and the fixing hole 24 and formed along the peripheral side surface parts 30, 31, and 32. The flat surface 71 is for example a ground surface formed by grinding.

The chip breaker 70 is formed on the outside of flat surface 71.

The second end surface 21 and the first end surface 20 are arranged with 180°-rotational symmetry around the central axis of the cutting insert 11 as viewed from the side of the peripheral side surface 22. The second end surface 21 has the same structure as that of the first end surface 20. More specifically, the second end surface 21 has a chip breaker 70, a flat surface 71, and a groove 72 similarly to the first end surface 20.

The cutting edges 23 have for example corner cutting edges 90, 91, and 92 corresponding to the corner parts 40, 41, and 42 and intermediate connection parts 93, 94, and 95 which connect adjacent ones among the corner cutting edges 90, 91, and 92 with each other. The intermediate connection parts 93, 94, and 95 may or may not optionally function as cutting edges.

Note that the vertical angle $\alpha 3$ (shown in FIG. 4) at each of the corner parts 40, 41, and 42 is for example preferably at least 20° and less than 60° and preferably about 35° particularly for profile machining.

The size of the cutting insert 11 is for example set so that the radius of the circumscribed circle of the end surface 20 or 21 is about 16 mm. The thickness of the cutting insert 11 (the distance between the end surfaces 20 and 21) is for example about 3 mm. The roundness (corner radius) of the corner parts 40, 41, and 42 is for example about 0.4 mm, preferably from 0.2 mm to 1.2 mm. The length of the cutting edge 23 from each corner of the corner parts 40, 41, and 42 to one side in the peripheral side surface direction is for example about 5 mm, preferably from 3 mm to 10 mm. The material of the cutting insert 11 may be selected from, but not limited to, any of hard materials such as cemented carbide, cermet, ceramics, and a sintered body containing cubic boron nitride or any of the hard materials having a surface coated with a PVD or CVD coating film, or monocrystalline diamond or a sintered body containing diamond.

Tool Body

Figure 8:
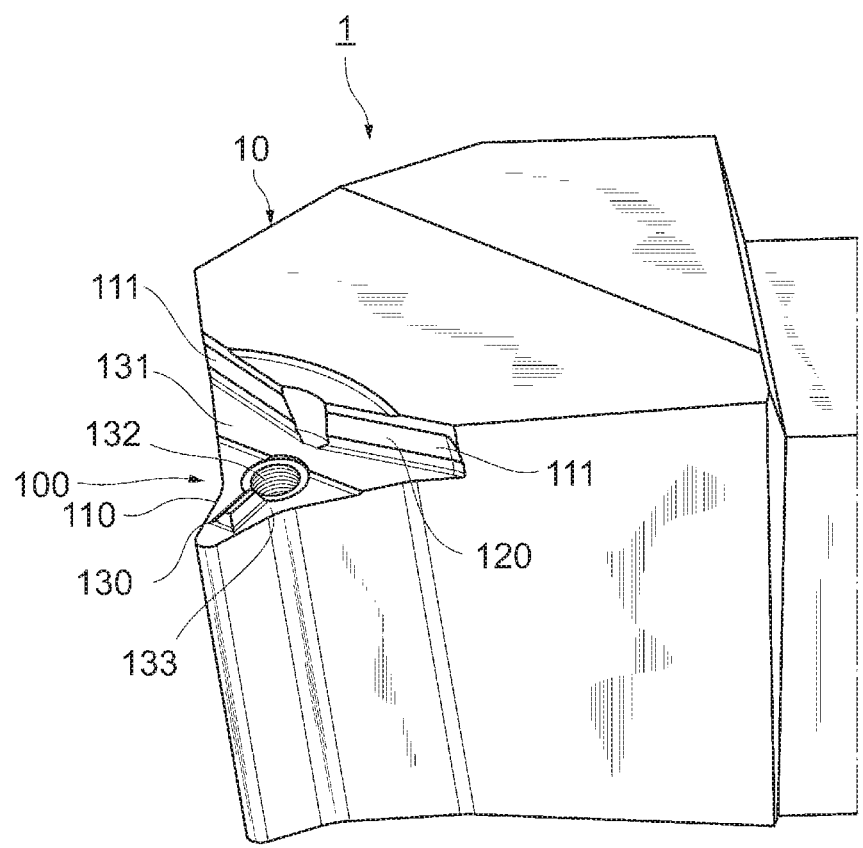
FIG. 8 is a perspective view of a holding part of a tool body.
Figure 9:
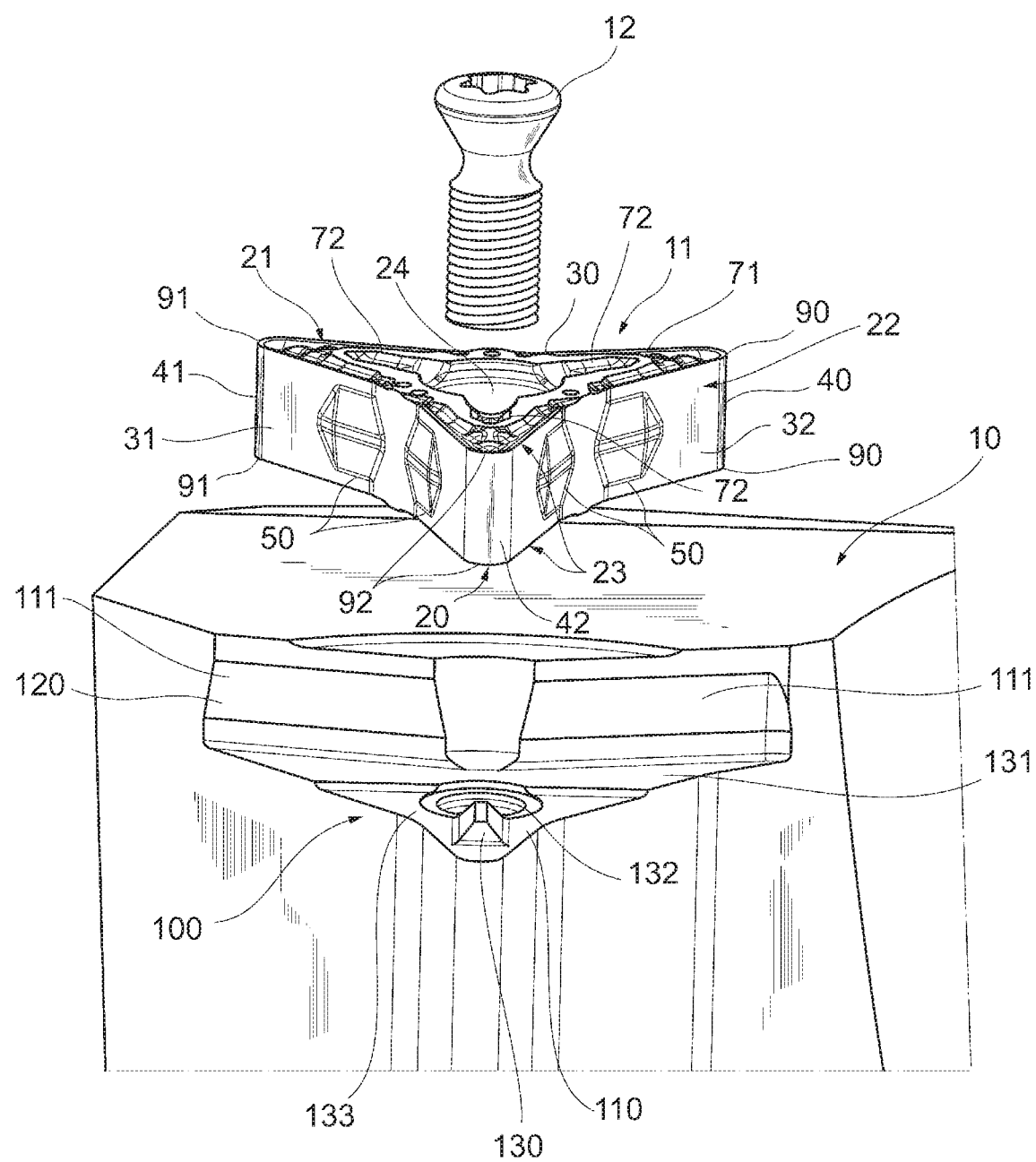
FIG. 9 is a perspective view of the holding part of the tool body and the cutting insert.

As shown in FIGS. 8 and 9, the tool body 10 includes a holder 100 which holds the cutting insert 11 at a tip end thereof. The holder 100 has a first holding surface 110 which holds the first or second end surface 20 or 21 of the cutting insert 11 and a second holding surface 111 which holds any of the peripheral side surface parts 30, 31, and 32 of the cutting insert 11 held at the first holding surface 110.

The first holding surface 110 has for example a substantially triangular shape in conformity with the outer shape of the cutting insert 11. The second holding surface 111 extends upright from the end of the first holding surface 110.

Figure 10:
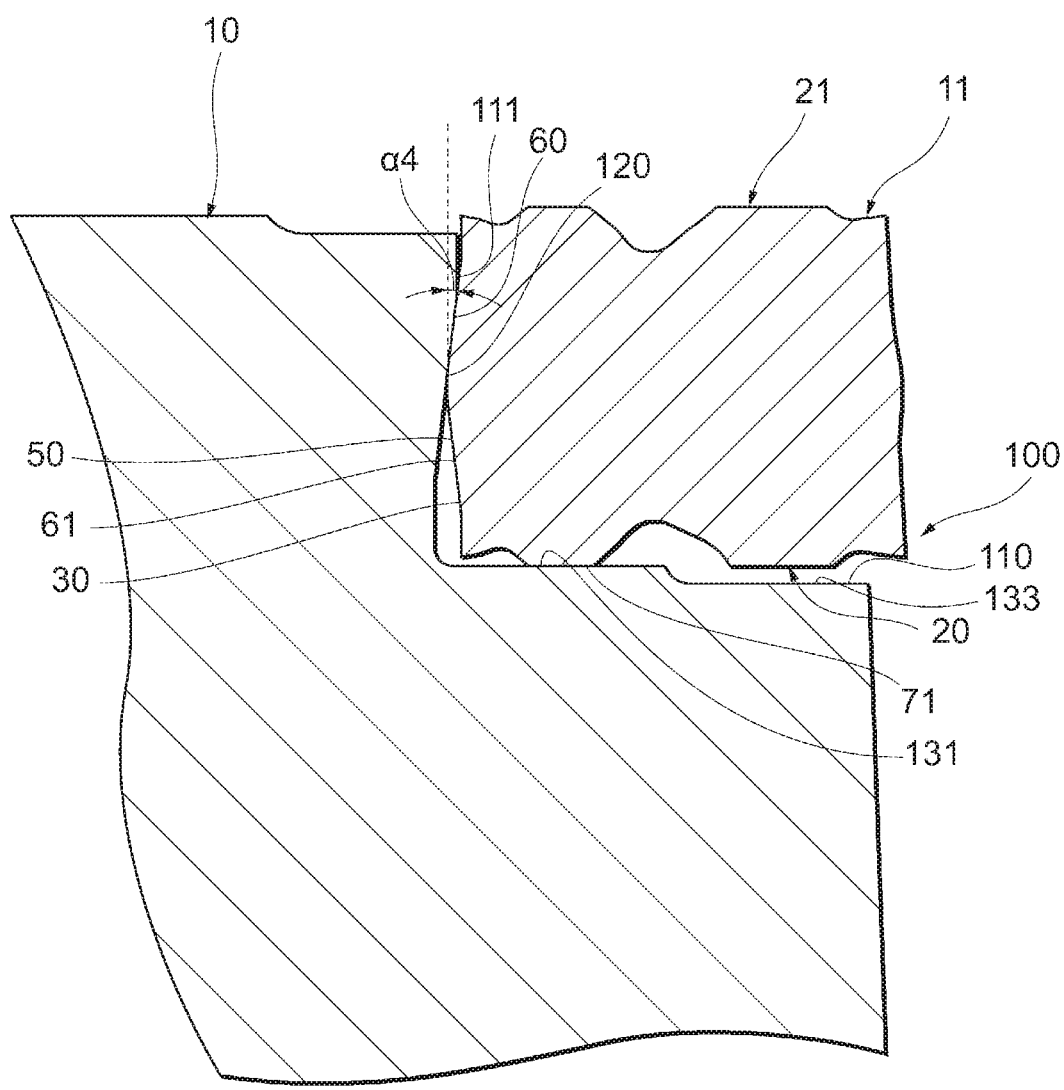
FIG. 10 is a longitudinal sectional view for illustrating a state in which the cutting insert is held at the holding part of the tool body.

The second holding surface 111 is formed to have a substantially V shape in conformity with the shape of the peripheral side surface parts 30, 31, and 32 of the cutting insert 11 when viewed from above. As shown in FIG. 10, the second holding surface 111 has a reversely inclined surface 120 which recedes inwardly from the upper side to the first holding surface 110. The inclination angle of the reversely inclined surface 120 (the inclination angle of the first holding surface 110 with respect to the vertical surface) $\alpha 4$ corresponds to the inclination angle $\alpha 1$ of the inclined surface 60 or 61 of the raised part 50 and is an angle equal to the inclination angle $\alpha 1$, for instance, about 10°. The reversely inclined surface 120 abuts against the first or second inclined surface 60 or 61 of the raised part 50 and can press the inclined surface 60 or 61 from above.

As shown in FIGS. 8 and 9, the first holding surface 110 has the protrusion 130 which is fitted in the groove 72 of the cutting insert 11, a flat holding surface 131 which receives the flat surface 71 of the cutting insert 11, and a fixing part 132 corresponding to the fixing hole 24 of the cutting insert 11.

The fixing part 132 is a screw hole for fixing in which a fastening screw 12 is screwed and formed substantially in the center of the first holding surface 110.

The protrusion 130 is provided at the first holding surface 110 on the opposite side to the second holding surface 111 with the fixing part 132 therebetween. The protrusion 130 is provided to extend from the fixing part 132 as the origin in a direction away from the second holding surface 111 (in the tip end direction of the tool body 10). The protrusion 130 is formed in a ridge shape to conform to the shape of the groove 72. As shown in FIG. 7, the upper surface of a longitudinal section of the protrusion 130 has an upward raised arc shape which can be fitted into the V-shape of the groove 72.

As shown in FIGS. 8 and 9, the flat holding surface 131 is formed between the second holding surface 111 and the fixing part 132. The flat holding surface 131 is formed to have a substantially square shape having a width from the second holding surface 111 to the side of the fixing part 132. The flat holding surface 131 is formed to conform to the second holding surface 111 when viewed from above. The fixing part 132 of the first holding surface 110 and the part 133 having the protrusion 130 are positioned one step lower than the flat holding surface 131.

Assembling of Cutting Tool

When the cutting insert 11 is mounted to the tool body 10, the cutting insert 11 is placed at the holder 100 of the tool body 10. At the time, as shown in FIG. 10, one of the end surfaces of the cutting insert 11, the first end surface 20 for example is directed to face downward to be placed on the first holding surface 110, and the peripheral side surface part 30 for example is placed on the second holding surface 111.

The second holding surface 111 abuts against the two raised parts 50 of the peripheral side surface part 30 and presses the raised parts 50 from above. More specifically, the reversely inclined surface 120 of the second holding surface 111 and the first inclined surface 60 arranged above the raised parts 50 abut against each other, so that the reversely inclined surface 120 presses the first inclined surface 60 from above.

The flat surface 71 of the first end surface 20 is placed on the flat holding surface 131 of the first holding surface 110. As shown in FIG. 7, the protrusion 130 is fitted into the groove 72 of the first end surface 20.

In this state, the fastening screw 12 shown in FIG. 9 for example is inserted into the fixing hole 24 of the cutting insert 11 and the fixing part 132 of the tool body 10, and the fastening screw 12 is fastened as shown in FIG. 1, so that the cutting insert 11 is fixed to the tool body 10.

Note that when any of the other peripheral side surface parts 31 and 32 is directed to face the second holding surface 111, the cutting insert 11 is held similarly to the case of the peripheral side surface part 30 described above. When the second end surface 21 is directed to face the side of the first holding surface 110, the cutting insert 11 is held similarly to the case of the first end surface 20 described above. When the second end surface 21 is held at the first holding surface 110, any of the peripheral side surface parts 30, 31, and 32 can be selected to be held at the second holding surface 111. Therefore, there are six patterns for holding the cutting insert 11 with respect to the tool body 10.

According to the embodiment, the raised parts 50 which change in height in the end surface direction X are formed at the peripheral side surface 22 of the cutting insert 11, so that the tool body 10 can press the raised parts 50 from above to hold the cutting insert 11. In this way, the cutting insert 11 is pressed with sufficient force toward the first holding surface 110 of the tool body 10 (downward), so that the cutting insert 11 can be prevented from being lifted from the tool body 10.

The raised part 50 includes the first inclined surface 60 which gradually rises from the side of the first end surface 20 to the center in the end surface direction X and the second inclined surface 61 which gradually rises from the side of the second end surface 21 to the center in the end surface direction X. In this way, the tool body 10 can press the first or second inclined surface 60 or 61 and thus can appropriately press the cutting insert 11 with sufficient force.

The two end surfaces 20 and 21 are formed to have a substantially triangular shape, the peripheral side surface 22 has a plurality of peripheral side surface parts 30, 31, and 32 corresponding to the sides of the end surfaces 20 and 21, and the raised parts 50 are provided at each of the peripheral side surface parts 30, 31, and 32. In this way, the cutting insert 11 can be changed in direction and used.

A plurality of raised parts 50 are provided at the peripheral side surface parts 30, 31, and 32, and therefore sufficient force is secured for pressing the raised parts 50 from above by the second holding surface 111 of the tool body 10.

The end surfaces 20 and 21 are each provided with the groove 72 which extends outwardly to the peripheral side surface 22 from the fixing hole 24, and force for pressing the cutting insert 11 can appropriately be received by the grooves 72 by fitting the grooves 72 in the protrusions 130 of the first holding surface 110 of the tool body 10. The cutting insert 11 can be prevented from turning relative to the tool main body 10.

The grooves 72 are provided at the end surfaces 20 and 21 in locations on the opposite side to the peripheral side surface parts 30, 31, and 32 with the fixing hole 24 therebetween. In this way, the grooves 72 are positioned away from the raised parts 50 of the peripheral side surface parts 30, 31, and 32, so that force for pressing the cutting insert 11 can appropriately be received at the raised parts 50 and the grooves 72 apart from each other. The cutting insert 11 can efficiently be prevented from turning relative to the tool main body 10.

The end surfaces 20 and 21 each have the flat surface 71 positioned higher than the other part. In this way, the flat surface 71 of the cutting insert 11 comes into close contact with the first holding surface 110 of the tool main body 10, so that force acting to press the cutting insert 11 from above by the second holding surface 111 of the tool main body 10 is received at the flat surface 71 and the cutting insert 11 can securely be fixed.

The flat surface 71 may be provided along the peripheral side surface parts 30, 31, and 32 between the fixing hole 24 and the peripheral side surface parts 30, 31, and 32. In this case, the flat surface 71 is close to the peripheral side surface parts 30, 31, and 32, and therefore the force acting to press the cutting insert 11 can appropriately be received at the flat surface 71.

The flat surface 71 is formed annularly at the end surfaces 20 and 21, and therefore chips are less likely to come inside beyond the flat surface 71. In this way, parts on the inner side of the flat surface 71 at the end surfaces 20 and 21 such as the grooves 72 can be prevented from being damaged by chips.

Although the preferred embodiment of the present invention has been described with reference to the accompanying drawings, the same is not intended to limit the present invention. It is understood that variations and modifications would be apparent to those skilled in the art within the scope of the concept recited in the claims and that the variations and modifications naturally fall within the technical scope of the present invention.

In the cutting tool 1, the cutting insert 11 is fixed to the tool main body 10 using the fastening screw 12 but the cutting insert may be fixed by any of other methods. For example, the cutting insert 11 may be fixed by lever locking or using a wedge, a presser piece, or an eccentric pin.

The cutting insert 11 according to the embodiment has a triangular shape but may have any of other polygonal shapes such as a square shape and a pentagonal shape. While the cutting tool 1 according to the embodiment is adapted for use in a lathe, the cutting tool may suitably be used for milling.

Example

Experiments were carried out for different values of the angle α1 and the height H of the raised parts 50 at the peripheral side surface 22 of the cutting insert 11. The cutting insert 11 was arranged inclined in the tool main body 10 so that the clearance angle is about 6°. Note however that the clearance angle was about 20° only for the raised part 50 having an angle of 50° (and a height of 1 mm) in order to prevent the raised part 50 from colliding against a workpiece. As for the other conditions, the material of the workpiece was carbon steel (S45C), the machining diameter φ was 100 mm, the machining length was 500 mm, the cutting was conducted by wet cutting (with a water-soluble cutting lubricant), the cutting speed Vc was 300 m/min, the maximum cutting depth ap was 3 mm, and the feed f was 0.4 mm/rev. In the results, evaluation A represents a result with no chippings generated after ten experiments, evaluation B represents a result with one or two chippings after ten experiments, evaluation C represents a result with three to five chippings after ten experiments, and evaluation D represents a result with six or more chippings after ten experiments. The results of the experiments are given in Table 1.

TABLE 1

| Angle (°) | 3 | 5 | 10 | 30 | 50 |
|---|---|---|---|---|---|
| Height (mm) | 0.05 | 0.1 | 0.2 | 0.6 | 1 |
| Result of experiment | D | B | A | B | C |

The present invention is useful in providing a cutting insert which can be prevented from being lifted from a tool main body.

What is claimed is:

1. A cutting insert, comprising:
first and second end surfaces opposed to each other;
a peripheral side surface extending between the end surfaces;
a cutting edge provided at an intersecting edge between at least one of the end surfaces and the peripheral side surface; and
a fixing hole extending from the first end surface to the second end surface, the fixing hole having an axis that is orthogonal to a midplane between the first end surface and the second end surface,
the peripheral side surface having raised parts changing in height relative to the axis of the fixing hole,
the raised parts each having a first inclined surface raised from a first end surface side to a center of the peripheral side surface in a direction extending from the first end surface towards the second end surface and a second inclined surface raised from a second end surface side to the center of the peripheral side surface in a direction extending from the second end surface towards the first end surface,
wherein
the end surfaces are formed in a polygonal shape having three or more sides,
the peripheral side surface has peripheral side surface parts corresponding to sides of the polygonal shape of the end surfaces,
at least one of the raised parts is provided at each of the peripheral side surface parts,
the fixing hole is formed in the center of the end surfaces,
the at least one end surface is provided with grooves extending outwardly from the fixing hole,
a flat surface is provided at the at least one end surface, the flat surface being further from the midplane in a direction parallel to the axis of the fixing hole than the cutting edge,
the flat surface surrounds the fixing hole on the at least one end surface,
along the peripheral side surface parts, the flat surface is provided between the peripheral side surface parts and positions surrounding the fixing hole and the grooves such that the flat surface completely surrounds the fixing hole and the grooves,
the cutting edge has corner cutting edges,
the corner cutting edges are formed at each corner of the polygonal shape of the end surfaces,
chip breakers are provided on the at least one end surface between the cutting edge and the flat surface,
the flat surface is provided between the chip breakers and the fixing hole,
the chip breakers are connected to the flat surface and extend in a groove shape from the flat surface toward each convex corner cutting edge,
the grooves extend outwardly from the fixing hole towards each corner of the polygonal shape of the at least one end surface,
the grooves, collectively, partially surround the fixing hole,
in a view parallel to the axis of the fixing hole, the peripheral side surface parts are each formed in a V-shape having a center which is recessed at a midpoint of each respective peripheral side surface part, and
the flat surface intersects each peripheral side surface part at the center of each peripheral side surface part.

2. The cutting insert according to claim 1, wherein each of the grooves is provided at a position opposing a portion of one of the peripheral side surface parts, with the fixing hole therebetween.

3. A cutting tool comprising a cutting insert and a tool body holding the cutting insert,
the cutting insert including:
first and second end surfaces opposed to each other;
a peripheral side surface extending between the end surfaces;
a cutting edge provided at an intersecting edge between at least one of the end surfaces and the peripheral side surface; and
a fixing hole extending from the first end surface to the second end surface, the fixing hole having an axis that is orthogonal to a midplane between the first end surface and the second end surface,
the peripheral side surface having raised parts changing in height relative to the axis of the fixing hole,
the raised parts each having a first inclined surface raised from a first end surface side to a center of the peripheral side surface in a direction extending from the first end surface towards the second end surface and a second inclined surface raised from a second end surface side to the center of the peripheral side surface in a direction extending from the second end surface towards the first end surface,
the tool body including:
a first holding surface holding one of the end surfaces of the cutting insert; and
a second holding surface holding the peripheral side surface of the cutting insert held at the first holding surface,
the second holding surface having a reversely inclined surface receding from an upper side toward the first holding surface,
the reversely inclined surface being configured to abut against the first or second inclined surface of each of a plurality of the raised parts to press the inclined surface from above,
wherein
the end surfaces are formed in a polygonal shape having three or more sides,
the peripheral side surface has peripheral side surface parts corresponding to sides of the polygonal shape of the end surfaces, at least one of the raised parts is provided at each of the peripheral side surface parts, the fixing hole is formed in the center of the end surfaces, the at least one end surface is provided with grooves extending outwardly from the fixing hole, a flat surface is provided at the at least one end surface, the flat surface being further from the midplane in a direction parallel to the axis of the fixing hole than the cutting, the flat surface surrounds the fixing hole on the at least one end surface, along the peripheral side surface parts, the flat surface is provided between the peripheral side surface parts and positions surrounding the fixing hole and the grooves such that the flat surface completely surrounds the fixing hole and the grooves, the cutting edge has corner cutting edges, the corner cutting edges are formed at each corner of the polygonal shape of the end surfaces, chip breakers are provided on the at least one end surface between the cutting edge and the flat surface, the flat surface is provided between the chip breakers and the fixing hole, the chip breakers are connected to the flat surface and extend in a groove shape from the flat surface toward each convex corner cutting edge, the grooves extend outwardly from the fixing hole towards each corner of the polygonal shape of the at least one end surface, the grooves, collectively, partially surround the fixing hole, in a view parallel to the axis of the fixing hole, the peripheral side surface parts are each formed in a V-shape having a center which is recessed at a midpoint of each respective peripheral side surface part, and the flat surface intersects each peripheral side surface part at the center of each peripheral side surface part.

4. The cutting tool according to claim 3, wherein the second holding surface abuts against each of the plurality of the raised parts at one of the peripheral side surface parts.

5. The cutting tool according to claim 4, wherein the first holding surface is provided with a protrusion to be fitted in at least one of the grooves.

6. The cutting tool according to claim 5, wherein each of the grooves is provided at a position opposing a portion of one of the peripheral side surface parts, with the fixing hole therebetween, and the protrusion is provided to be fitted in the groove opposing the portion of the peripheral side surface part held at the second holding surface, with the fixing hole therebetween.

7. The cutting tool according to claim 4, wherein the first holding surface is provided with a flat holding surface contacted by at least a part of the flat surface.

8. The cutting tool according to claim 7, wherein the flat holding surface is provided in contact with the flat surface between the peripheral side surface part held at the second holding surface and the fixing hole.

\* \* \* \* \*